United States Patent [19]

Knotik et al.

[11] 4,208,243

[45] Jun. 17, 1980

[54] THIN FILM TREATMENT APPARATUS

[75] Inventors: Karl Knotik, Eisenhut; Peter Leichter, Vienna, both of Austria

[73] Assignee: Oesterreichische Studiengesellschaft für Atomenergie Ges.m.b.H., Vienna, Austria

[21] Appl. No.: 922,175

[22] Filed: Jul. 5, 1978

[30] Foreign Application Priority Data

Jul. 13, 1977 [AT] Austria .................................. 5023/77

[51] Int. Cl.² .............................................. B01D 1/24
[52] U.S. Cl. ............................ 159/6 W; 159/DIG. 15; 15/236 C; 159/13 A
[58] Field of Search ......... 159/DIG. 15, 6 W, 6 WH; 15/236 C, 236 R

[56] References Cited

U.S. PATENT DOCUMENTS

| 3,054,729 | 9/1962 | Smith | 159/DIG. 15 |
| 3,190,817 | 6/1965 | Neugebauer | 159/6 W |
| 3,266,555 | 8/1966 | Thier | 159/DIG. 15 |

Primary Examiner—Norman Yudkoff
Attorney, Agent, or Firm—Werner W. Kleeman

[57] ABSTRACT

A thin film treatment apparatus, especially a thin film evaporator, comprising a rotor having a shaft and a rotationally symmetrical wall arranged about said rotor. The rotor is equipped with essentially radial, elastically resilient scraper elements extending up to such wall. These scraper elements are of essentially blade-shaped construction, and these scraper elements and the rotor are at least partially covered with an elastomeric material.

8 Claims, 8 Drawing Figures

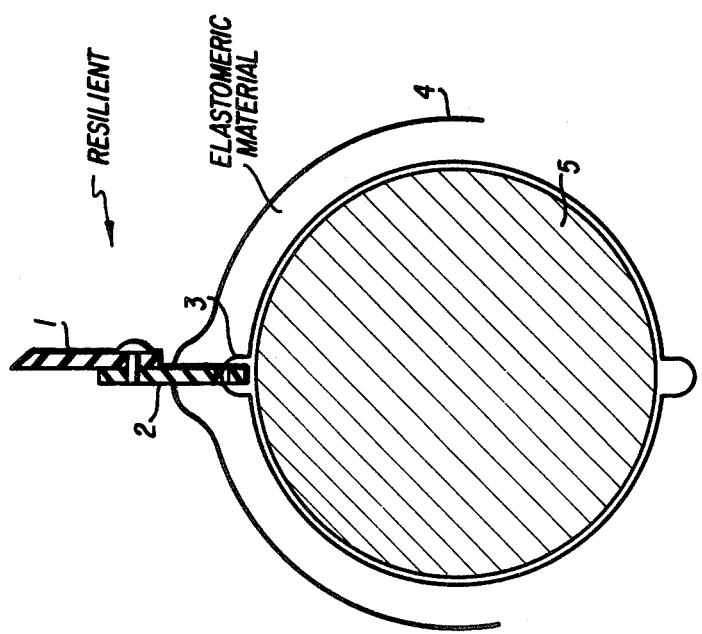
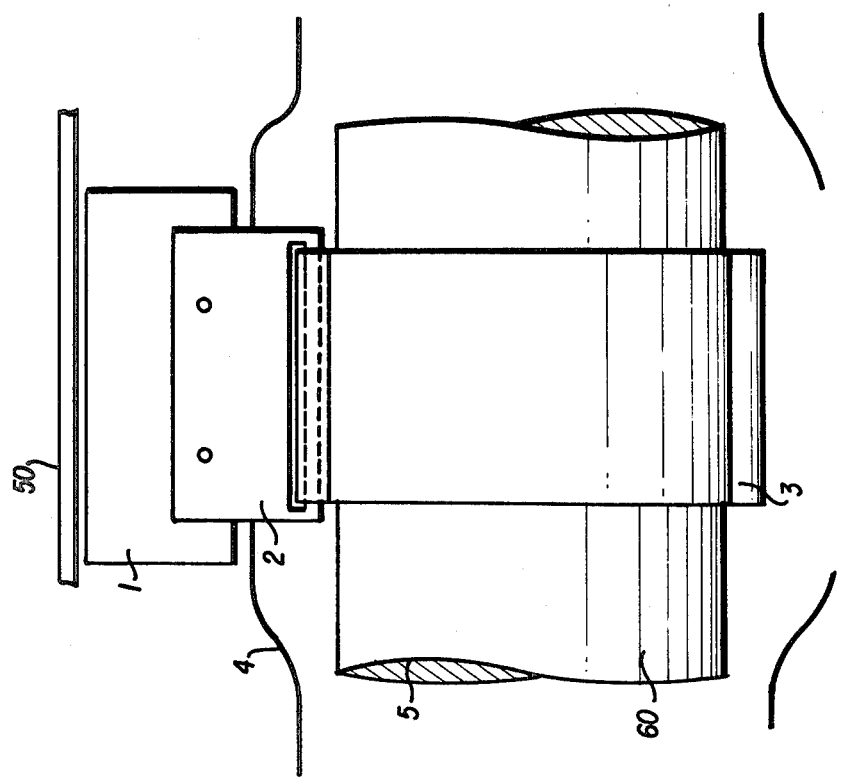
FIG. 1b
FIG. 1a

THIN FILM TREATMENT APPARATUS

BACKGROUND OF THE INVENTION

The present invention broadly relates to an apparatus for the processing of fluid or fluent materials, and, more specifically, relates to a new and improved construction of a thin film treatment apparatus, especially a thin film evaporator for the treatment of flowable or liqueform materials.

Prior art thin film treatment apparatus possess a heated or cooled rotationally symmetrical housing, for instance in the form of a conical or cylindrical housing, within which there is arranged a rotor driven by a motor. The rotor is equipped with scraper or distributor elements which uniformly distribute the liquid infed from above and onto the inner wall of the housing. These scraper or distributor elements simultaneously ensure that the solids which have solidified from the liquid and have deposited at the housing wall will be removed.

The rotors can have scraper elements or the like of the most different constructions. Thus, for instance, there are known to the art scraper elements which are mounted at the rotor and are pressed by the action of centrifugal force against the inner wall of the housing. In this way there is achieved a uniform distribution of the liquid and a scraping of the solids or solid materials. What is disadvantageous with this state-of-the-art construction is that the scraper elements experience a pronounced wear, so that the dried material is contaminated. Furthermore, the solids which are to be separated can accumulate in the bearings of the scraper elements at the rotor, so that the scraper elements no longer can be moved or only with extreme difficulty. Consequently, the scraper elements no longer can be directed towards the housing wall by the effect of the centrifugal forces which act during operation of the thin film treatment apparatus.

Furthermore, there is also known to the art a thin film treatment apparatus having a rotor containing wire brushes. These wire brushes comprise wires extending in radial direction. With this construction there is achieved a lesser wear and the scraper elements are elastically resilient, however also with this construction there is a tendency for the solids to accumulate at the surface of the rotor, specially in the wire brushes. When this happens the mobility of the scraper elements is reduced or prevented and there is required a frequent cleaning of the rotor in order to avoid operational disturbances.

SUMMARY OF THE INVENTION

Hence, with the foregoing in mind it is a primary object of the present invention to provide a new and improved construction of thin film treatment apparatus which is not associated with the aforementioned drawbacks and limitations of the prior art proposals.

Yet a further significant object of the present invention aims at devising a thin film treatment apparatus which effectively avoids, or at the very least appreciably reduces the above-explained drawbacks of the state-of-the-art constructions, and is especially easy to service and carry out maintenance work, and thus, is particularly suitable for handling radioactive or otherwise biologically toxic substances.

Still a further significant object of the present invention is to devise a new and improved construction of thin film treatment apparatus which is relatively simple in design, economical to manufacture, extremely reliable in operation, requires a minimum of maintenance and servicing and is not readily subject to breakdown or malfunction.

Another important object of the present invention relates to a novel construction of thin film treatment apparatus, especially, although not exclusively, a thin film evaporator equipped with a rotor carrying essentially blade-shaped scraper elements or the like, wherein the rotor and the scraper elements are at least partially covered or otherwise provided with an elastomeric material, in order to avoid or at least minimize the aforementioned drawbacks existing with the prior art equipment discussed heretofore.

Now in order to implement these and still further objects of the invention, which will become more readily apparent as the description proceeds, the thin film treatment apparatus of the present development, which especially may be structured as a thin film evaporator although not exclusively need work in this manner, will be understood to comprise a rotor having a shaft and a substantially rotationally symmetrical wall arranged about such rotor. The rotor is equipped with essentially radially extending, elastically resilient scraper elements which extend up to the region of the wall. The scraper elements are structured as blade-shaped elements and such blade-shaped elements and the rotor are at least partially coated or covered with an elastomeric material.

Due to this construction there is effectively avoided any extreme deposition of solidified substances at the inner wall and at the rotor surface, since by virtue of deformation of the surfaces, as the same are produced by the scraper elements or by vibrations or the like, the solids no longer can adhere to the surface so that there is prevented the deposition of incrustations, and therefore, there is also prevented the formation of dry material lumps or conglomerations which disturb the proper functioning of the equipment.

If the elastomeric material is composed of silicone rubber or fluoroelastomers, then there is beneficially achieved on the one hand, a surface which is particularly adverse to adhesion, and which is temperature and corrosion resistant and at the same time also propagates in a particularly advantageous manner vibrations and the like.

If the elastomeric material consists of rubber, then by suitable selection of its composition, for instance, fillers, different polymers and the like, there can be achieved a particularly good adaptation to the desired elastic properties, and at the same time there can be also adjusted a predetermined damping value.

If the connection between the scraper elements and the rotor is surrounded by the elastomeric material, then it is possible to thus achieve an extremely simple construction. The restoring forces for the scraper elements can be exerted by the elastomeric material, and at the same time due to the movement of the scraper elements there occurs a deformation of the surface of the elastomeric material. This surface deformation effectively prevents undesired material deposition thereon.

If the scraper elements or the like are movably connected with the rotor, then, on the one hand, there can be especially beneficially avoided damage to the scraper elements, and on the other hand, there is furthermore ensured for their radial projection or extension due to the elastomeric covering and the centrifugal force. These objectives are then particularly advantageously realized when the scraper elements are mounted in the rotor.

If the scraper elements are connected by means of a holder or holder means with the rotor shaft, then there can be realized a rotor structure which has particularly low maintenance and servicing requirements, and which also structurally is of extremely simple design.

A preferred constructional embodiment of the invention contemplates that there is formed a unit from the scraper elements and the elastomeric material which can be inserted onto the rotor shaft. Due to this design there is realised a particularly simple and easy to care for construction, which can be assembled and disassembled by simple displacement manipulations.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1a is fragmentary sectional view showing a thin film treatment apparatus constructed according to the present invention, particularly illustrating the details of the rotor unit constructed according to the invention and only showing part of the housing defining the wall with which coact the scraper blades;

FIG. 1b is a sectional view of the arrangement shown in FIG. 1a;

FIG. 3b is a fragmentary view showing details of the arrangement of FIG. 3a;

DETAILED DESCRIPTION OF THE PREFERRED EMBODIMENTS

Figure 2:
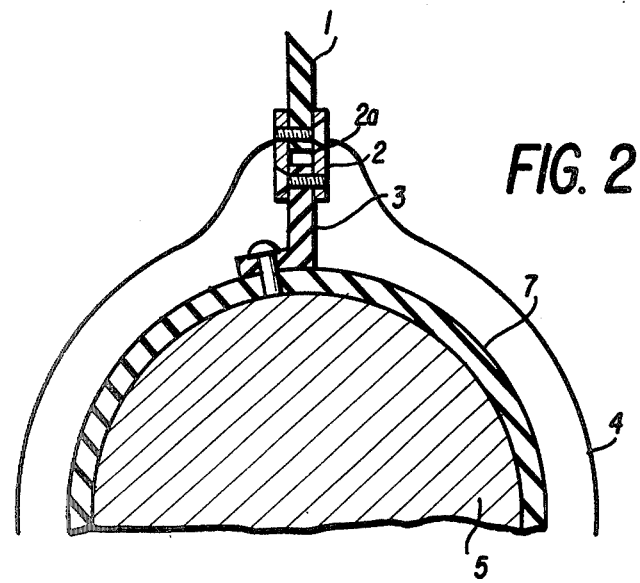
FIG. 2 is a fragmentary sectional view of a modified rotor structure having a different arrangement of the scraper elements.

Describing now the drawings, it is to be understood that only enough of the construction of the thin film treatment apparatus, which may be assumed by way of example but not limitation, to constitute a thin film evaporator, has been shown in the drawings to enable those skilled in the art to readily understand the underlying principles and concepts of the present development. To simplify the showing of the drawings, in FIG. 1a there has only been illustrated part of the housing wall 50 within which there is rotatably mounted the rotor unit 60. The invention is not concerned with any specific construction of housing and manner of mounting the rotor assembly within the housing, and conventional techniques and arrangements can be employed as are well known to the art. There are numerous publications and patents teaching thin film treatment apparatus embodying a housing within which there is arranged a rotor, such as exemplified by any one of U.S. Pat. Nos. 3,090,732, 3,199,574, 3,199,575 and 3,554,263. Therefore, in the description to follow the main thrust of the disclosure will be directed to those features of the present invention which are considered to be novel and relating directly to the principles of the present inention. Equally, as a matter of convenience there have been generally used throughout the various embodiments the same reference characters to denote the same or analogous elements.

Figure 3A:
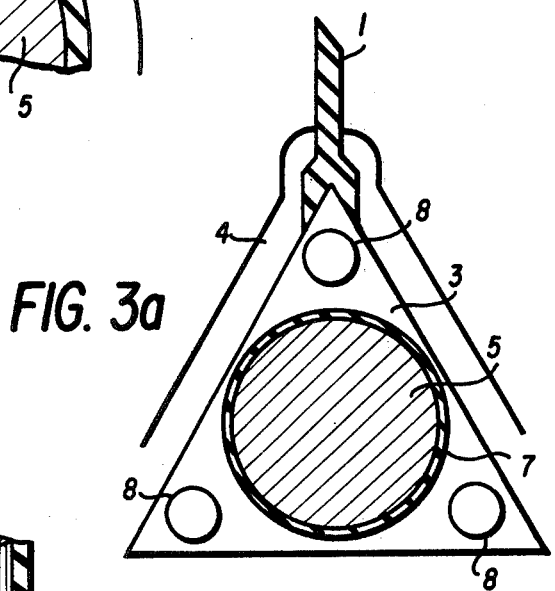
FIG. 3a is a fragmentary sectional view of a still further modified rotor construction having a different arrangement of the scraper elements.
Figure 3B:
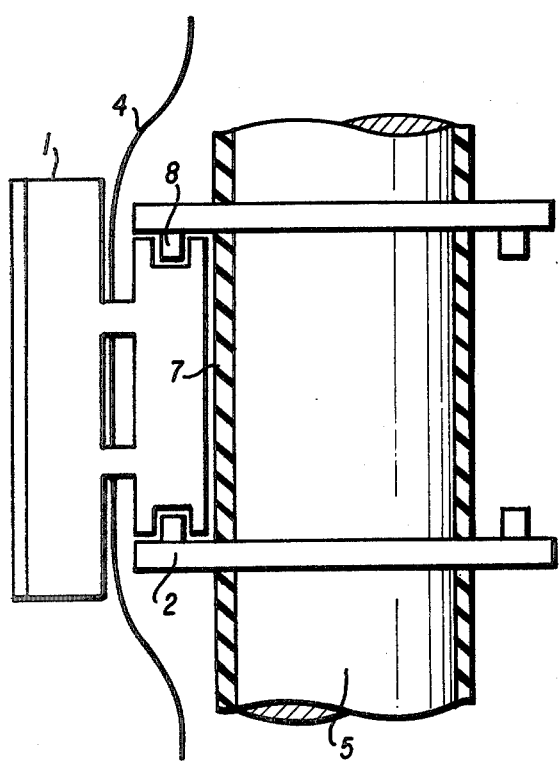
Figure 4:
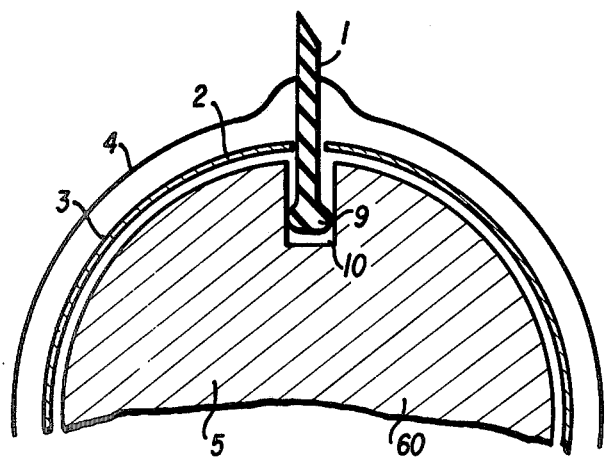
FIG. 4 is a fragmentary sectional view of a rotor structure having a still different arrangement of scraper elements, wherein the illustrated scraper element is shown partially arranged in the rotor shaft.

At this point it is generally remarked that in FIGS. 1a and 1b, 2, 3a and 3b, 5 and 6 there are illustrated constructions of scraper elements which are connected by holder means or holders with the rotor shaft, whereas in the modified construction of FIG. 4 there is shown a scraper element which is partially arranged in the related rotor shaft. Also, it is here mentioned that to preserve clarity of illustration in the respective figures of the drawings there have generally been only shown one or two of the scraper elements or equivalent structure, although obviously, and again as is well known in the thin film treatment apparatus, any desired number of such scraper elements can be arranged around the circumference of the rotor unit or device at suitable locations thereof.

Turning attention now more specifically to the exemplary embodiments shown in FIGS. 1a and 1b, constituting fragmentary sectional views of a first exemplary embodiment of rotor or rotor device, generally designated by reference character 60, and rotatably mounted within a treatment housing defining the treatment wall or wall means 50 only partially shown in FIG. 1a to preserve clarity in illustration, there will be seen that there is mounted upon the rotor shaft 5 of the rotor 60 two oppositely situated scraper elements 1 or equivalent structure, preferably formed of a suitable wear resistant material, such as for instance a hard alloy or metal such as a carbide metal. The two diametrically oppositely located scraper or distributor elements 1 are movably connected with the rotor 60 by means of a holder 2 coacting with a steel band collar 3 which is strapped about the rotor shaft 5. This unit composed of the holder 2 and the steel band collar 3 is integrated into a hose-like covering 4 composed of fluoroelastomeric material and which can be simply shoved over the rotor shaft and then conveniently secured thereto in any appropriate fashion. This unit can be combined with further units which can be successively mounted, and whenever necessary, disassembled.

Now in the exemplary embodiment of FIG. 2, partially shown in sectional view, two or more symmetrical radially arranged scraper or distributor elements 1 formed of a wear resistant material, such as the previously mentioned hard alloy or metal, are each mounted at a respective resilient steel blade 3 by means of a simple mounting bracket or mounting element 2a. Each such resilient blade, which is preferably formed of steel, is attached to a 'iolder device and specifically here in the form of a steel tube or pipe 7 engaging about the outer circumference of the rotor shaft 5. This arrangement is provided with an elastic covering 4 and is mounted by being shoved into the rotor shaft 5. This unit likewise can be combined with further units in accordance with the dimensions of the rotor 60.

Now in FIGS. 3a and 3b there are shown partially in sectional view further embodiments of the invention, wherein in this case three scraper or distributor elements 1 are connected by means of a bearing or support arrangement 8 with a holder or holder means 2, the parts of which are fixed relative to one another by a tube or pipe member 7. Also in this case the arrangement is equipped with an elastic covering 4 formed of rubber and is suitably fixed in position after mounting upon the rotor shaft 5. Of course, this arrangement can be provided with two oppositely situated scraper elements instead of the three scraper elements 1 mentioned above.

Continuing, the embodiment shown in FIG. 4 consists of two or more radially arranged scraper elements 1 or the like which are inserted through a substantially tubular-shaped holder 2. The enlarged end 9 of each such scraper element 1 prevents that the related scraper element will be propelled or forced out of the holder or holder means 2 during rotation of the rotor shaft 5 of the rotor unit 60 by the action of the centrifugal forces. Upon mounting of the scraper elements or blades 1 upon the rotor shaft 5 these enlarged ends 9 are seated in a related groove 10 provided at the rotor shaft 5. The arrangement here is also provided with an elastomeric covering or coating 4 formed of silicone rubber and can be likewise combined with further elements.

Figure 5:
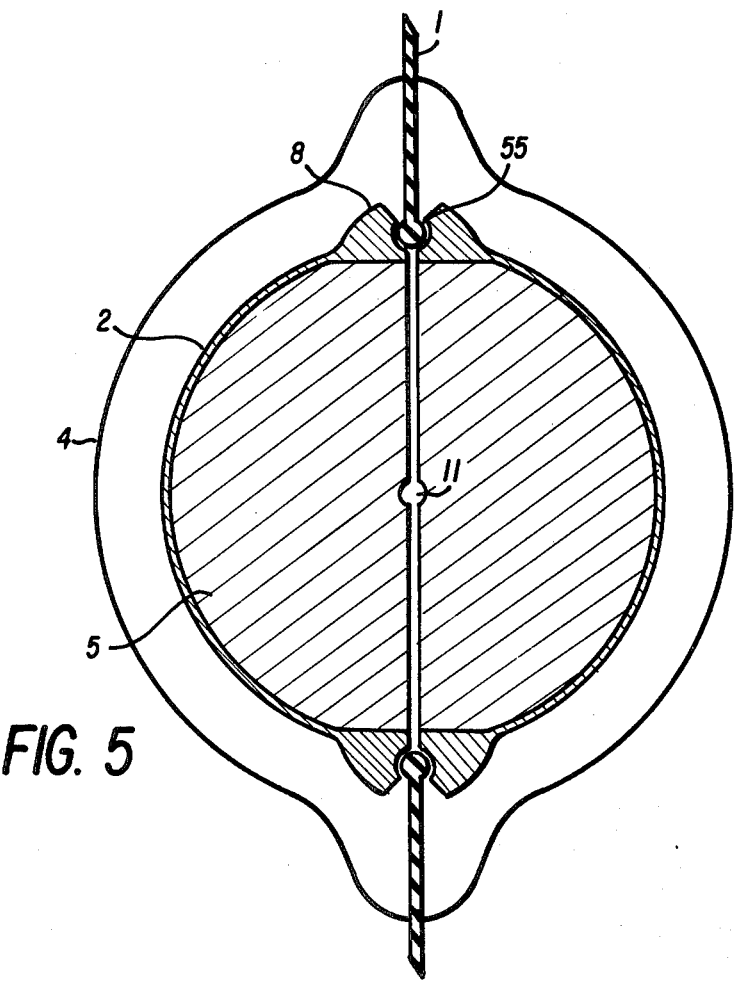
FIG. 5 is a sectional view of a still further construction of a rotor unit or device having a different arrangement of the scraper elements.

FIG. 5 shows an arrangement having movable blade-like scraper elements 1, the ends of which are connected by a bearing means or bearing arrangement 8 equipped with lubricant with a substantially tubular-shaped holder or holder means 2. This arrangement is provided with an elastomeric covering or coating 4 and is mounted upon the rotor shaft 5 such that the hinge locations or hinges 55 of the scraper elements 1 are supplied with lubricant by means of a central lubrication channel or duct 11.

Figure 6:
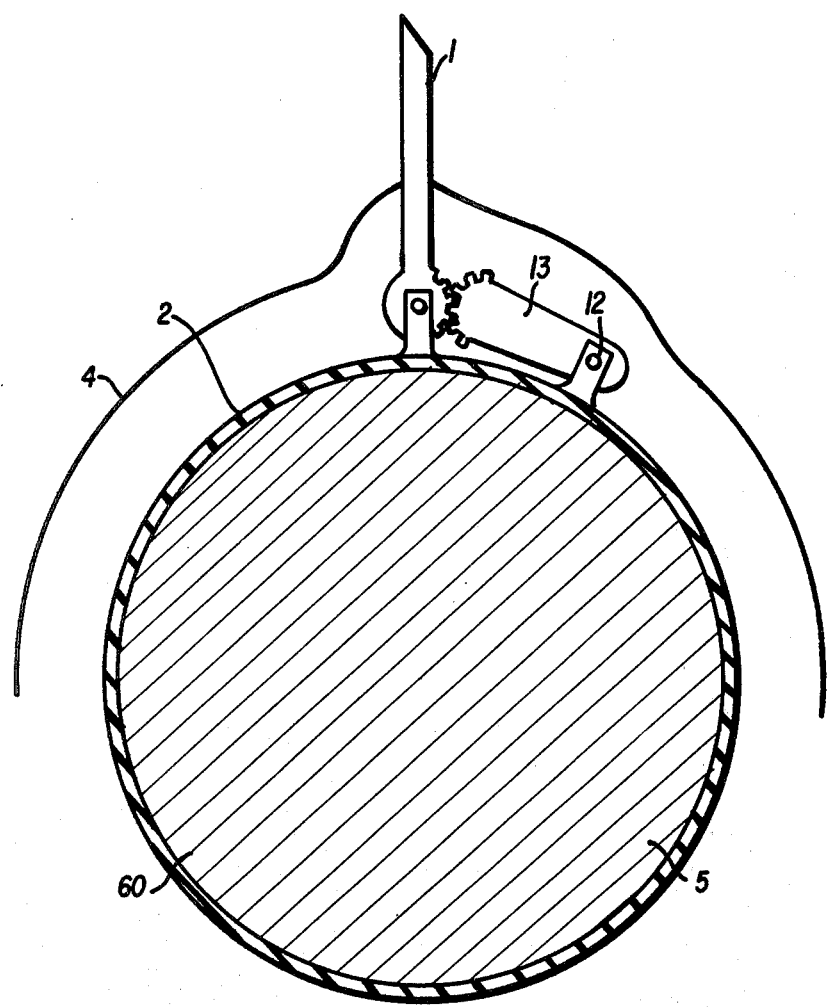
FIG. 6 is a fragmentary sectional view of a still further construction of a rotor unit having a different arrangement of the scraper elements.

A further possible construction has been shown in FIG. 6 where there is employed a torsion spring 12 in conjunction with the illustrated scraper element 1. The restoring force of the torsion spring 12 is transmitted by means of the toothed segment 13 to the toothed blade-like scraper element 1. This mechanism is attached to a substantially tubular-shaped holder or holder means 2 and provided with an elastic covering or coating 4. These units are again combined with one another in accordance with the dimensions of the rotor 60 and mounted and secured at the rotor shaft 5 in any suitable fashion.

The blade-like or blade-shaped elements 1 disclosed above with regard to the various embodiments discussed in conjunction with FIGS. 1a, 1b, 2, 3a, 3b, 4, 5 and 6 extend up to the wall 50 of the thin film treatment apparatus here presumed to be a thin film evaporator. There is not any contact with the wall 50. Other embodiments for equipment operating at excess pressure, negative pressure and standard or normal pressure, can be equipped with at least partially movable scraper elements and likewise ensure for a crust-free drying operation, since the prevailing vibrations are transmitted to the elastomeric surface of the rotor. It can be particularly advantageous for the inventive exemplary embodiments disclosed herein if the design of the rotor is not perfected only from similar type pre-adjusted arrangements, rather also can be accomplished by using such having different constructions. For the positive fixation of the inserted units at the rotor shaft it is advantageous if such possesses a form deviating from the cylindrical shape, such as having machined or milled surfaces, grooves or the like. Obviously, any suitable expedients can be used by securing the units to the rotor shaft as will readily suggest themselves to those skilled in the art apart from those mentioned by way of example herein.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A thin film evaporator, comprising:
a rotor having a shaft and a rotationally symmetrical wall arranged about said rotor,
said rotor having essentially radial, elastically resilient scraper elements having a base and extending nearly up to the region of said wall,
said scraper elements having no contact with the wall and each of said scraper elements having a blade configuration,
means at the rotor for connecting each of said scraper elements at its base with the rotor, and
means for surrounding said connecting means and said rotor with an elastomeric material.

2. The evaporator as defined in claim 1, wherein:
said elastomeric material comprises silicone rubber.

3. The evaporator as defined in claim 1, wherein:
said elastomeric material comprises fluoroelastomers.

4. The evaporator as defined in claim 1, wherein:
said elastomeric material comprises rubber.

5. The evaporator as defined in claim 1, further comprising:
means for at least partially movably connecting each of said scraper elements with said rotor.

6. The evaporator as defined in claim 1, wherein:
said rotor is structured such that each of said scraper elements is mounted therein.

7. The evaporator as defined in claim 1, further comprising:
holder means for connecting each of the scraper elements with the shaft of the rotor.

8. The evaporator as defined in claim 1, wherein:
said scraper elements and said surrounding means with the elastomeric material form a unit which can be pushed onto the shaft of the rotor.

* * * * *